(12) United States Patent
Foy et al.

(10) Patent No.: US 11,808,054 B2
(45) Date of Patent: Nov. 7, 2023

(54) SPA PERIPHERAL WALL AND METHOD OF ASSEMBLY

(71) Applicant: 9213-4550 QUÉBEC INC., Drummondville (CA)

(72) Inventors: Jérôme Foy, Orford (CA); Charles Goulet, Drummondville (CA)

(73) Assignee: 9213-4550 QUÉBEC INC., Drummondville (CA)

( * ) Notice: Subject to any disclaimer, the term of this patent is extended or adjusted under 35 U.S.C. 154(b) by 217 days.

(21) Appl. No.: 17/337,500

(22) Filed: Jun. 3, 2021

(65) Prior Publication Data

US 2021/0381265 A1 Dec. 9, 2021

Related U.S. Application Data

(60) Provisional application No. 63/035,066, filed on Jun. 5, 2020.

(51) Int. Cl.
*E04H 4/00* (2006.01)
*B29C 41/04* (2006.01)

(52) U.S. Cl.
CPC ............ *E04H 4/0037* (2013.01); *B29C 41/04* (2013.01)

(58) Field of Classification Search
CPC ... E04H 4/0031; E04H 4/0037; E04H 4/0043; E04H 4/005; E04H 2004/0068; B29C 41/04; A61H 33/6005
See application file for complete search history.

(56) References Cited

FOREIGN PATENT DOCUMENTS

EP              2447447 A1 *  5/2012   ............. A61H 33/02

* cited by examiner

*Primary Examiner* — Christopher J Besler
(74) *Attorney, Agent, or Firm* — Alexandre Daoust; Norton Rose Fulbright Canada LLP

(57) ABSTRACT

A method of manufacturing a spa including molding a plurality of side walls, cutting utility openings in said side walls, thereby producing cutouts which are then secured to the side wall and cover at least a part of the utility opening. The cutouts may cover the same utility opening from which it stems or a different utility opening from the same side wall or different side wall. The side walls may be made integral to the basin, such as in rotomolded spas, or made separate from the basin. Certain cutouts are rotated so as to have a major dimension of the cutout cover a minor dimension of the utility opening. Certain cutouts are trimmed from their initial size so as to cover a utility opening smaller than the utility opening from which it stems.

15 Claims, 12 Drawing Sheets

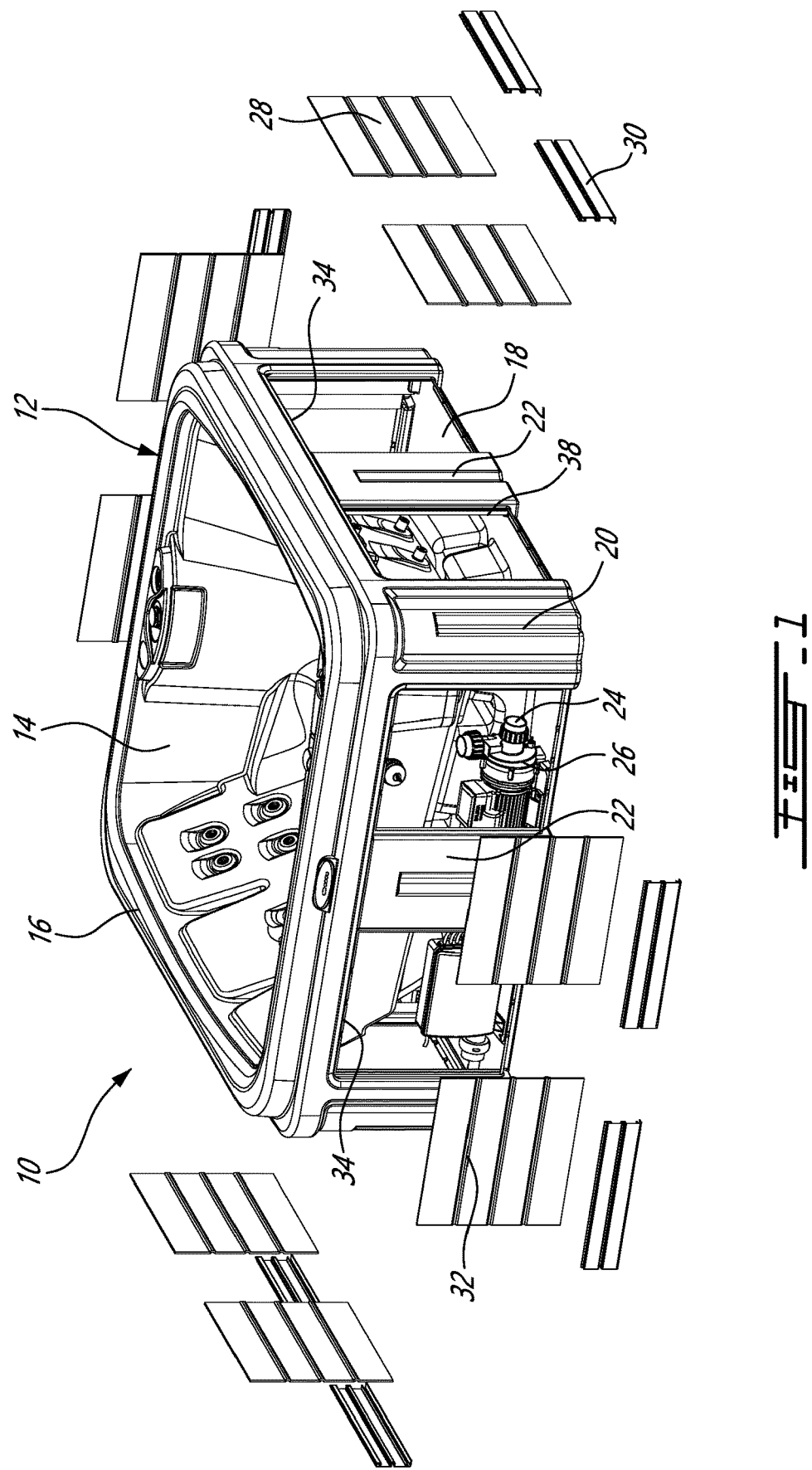

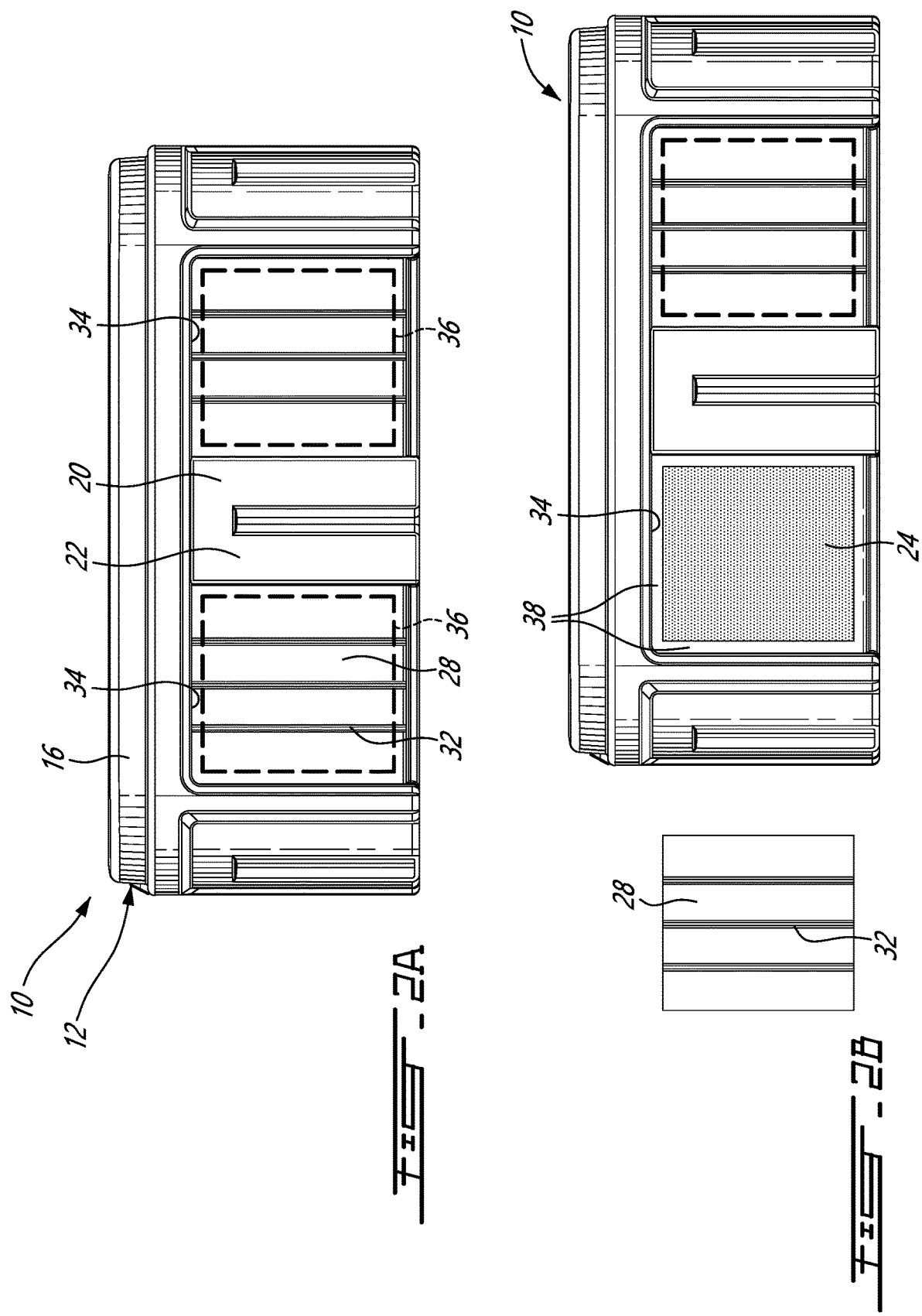

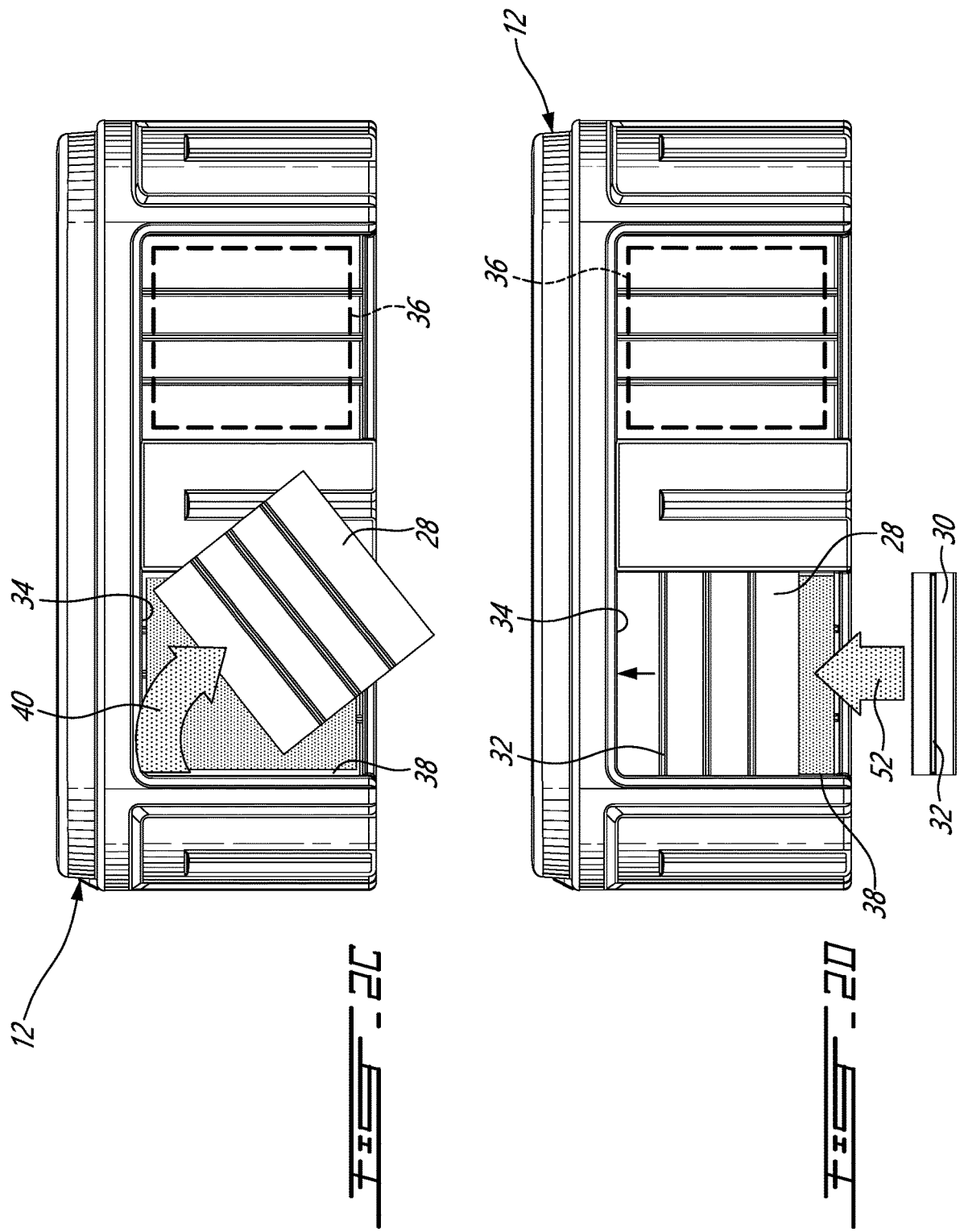

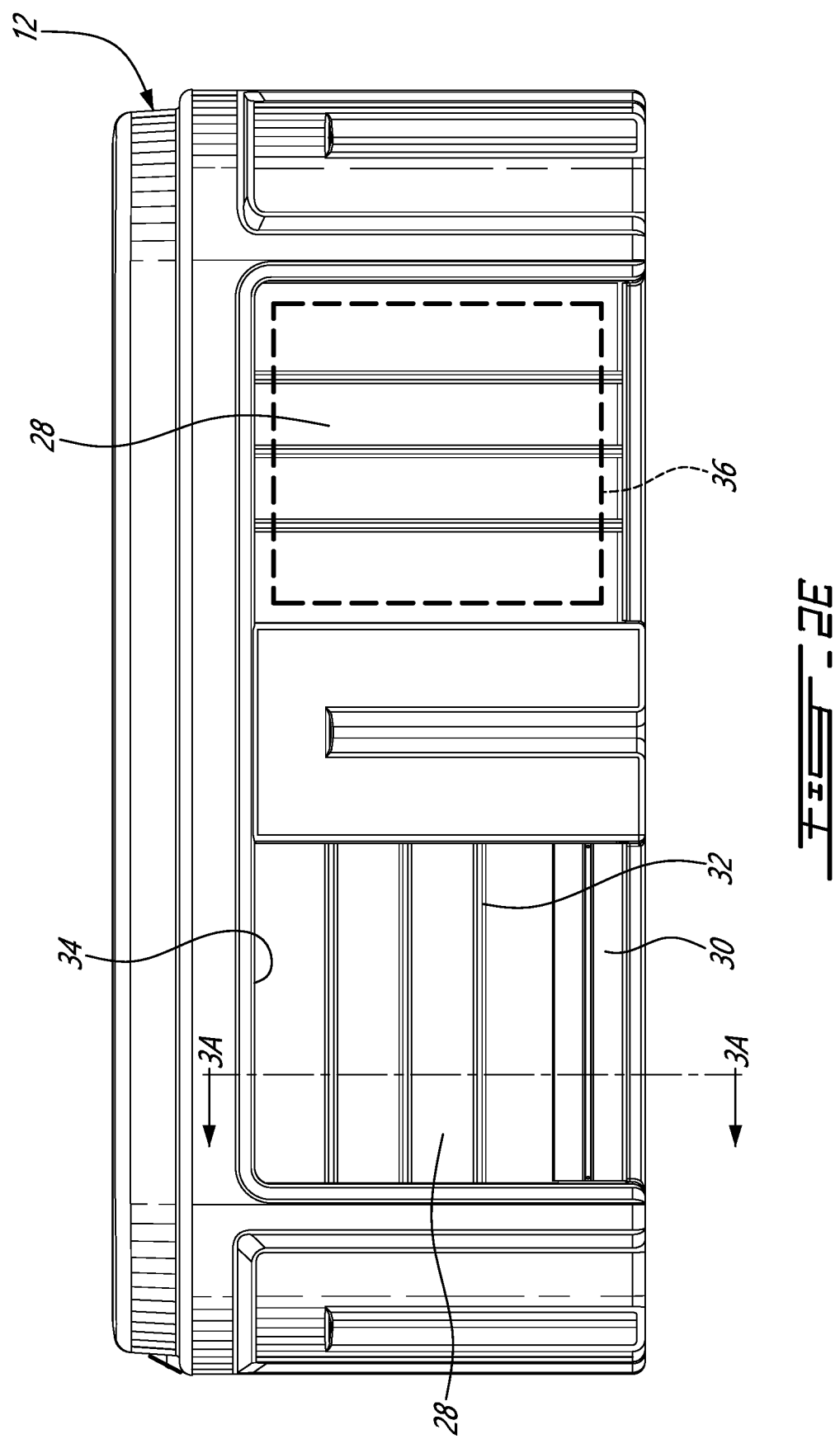

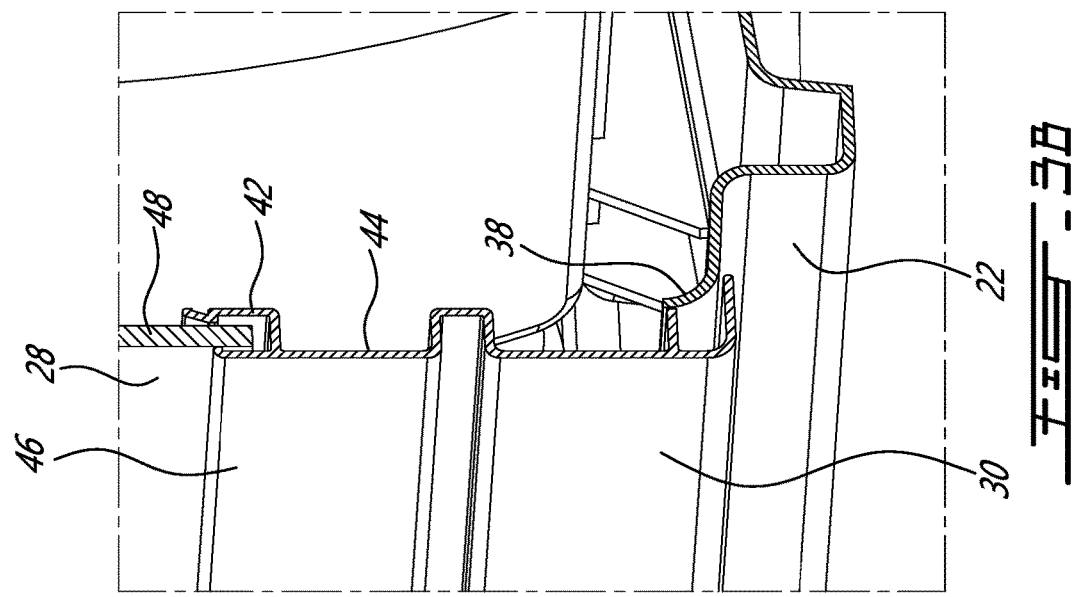
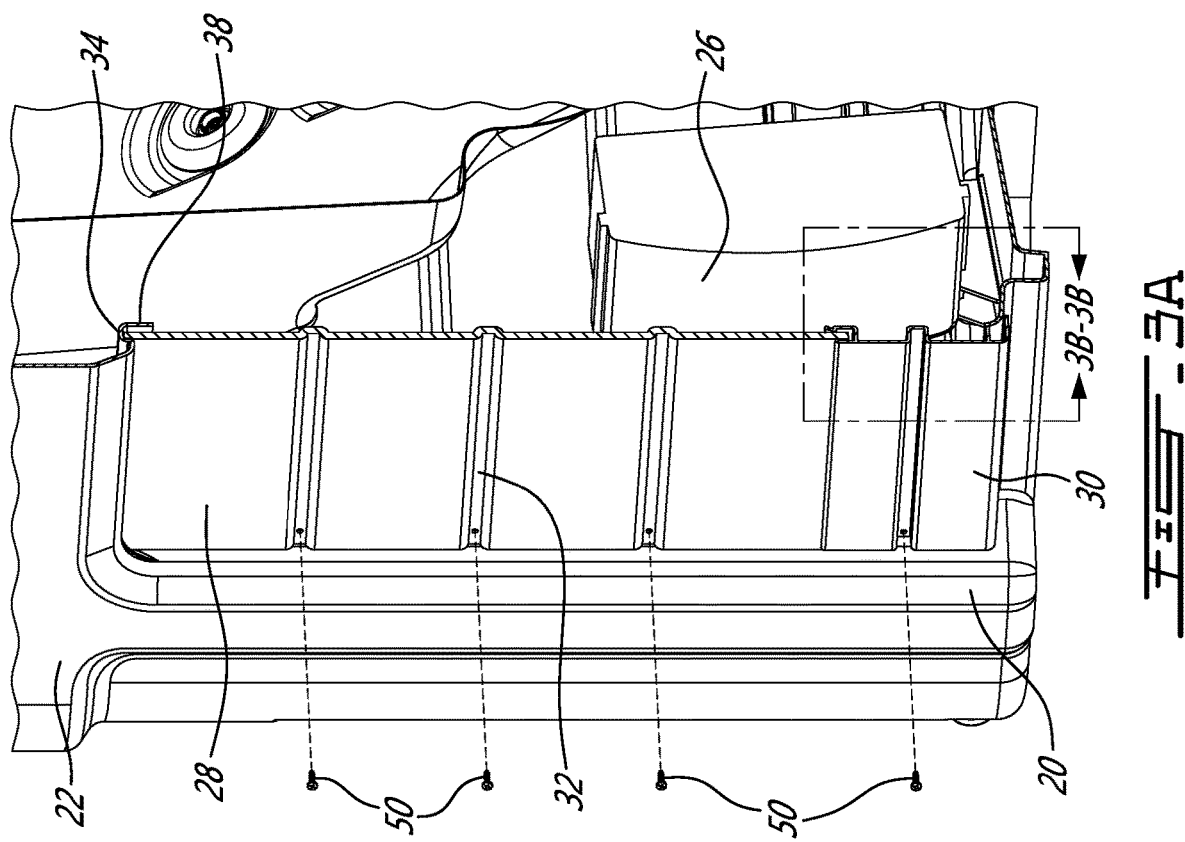

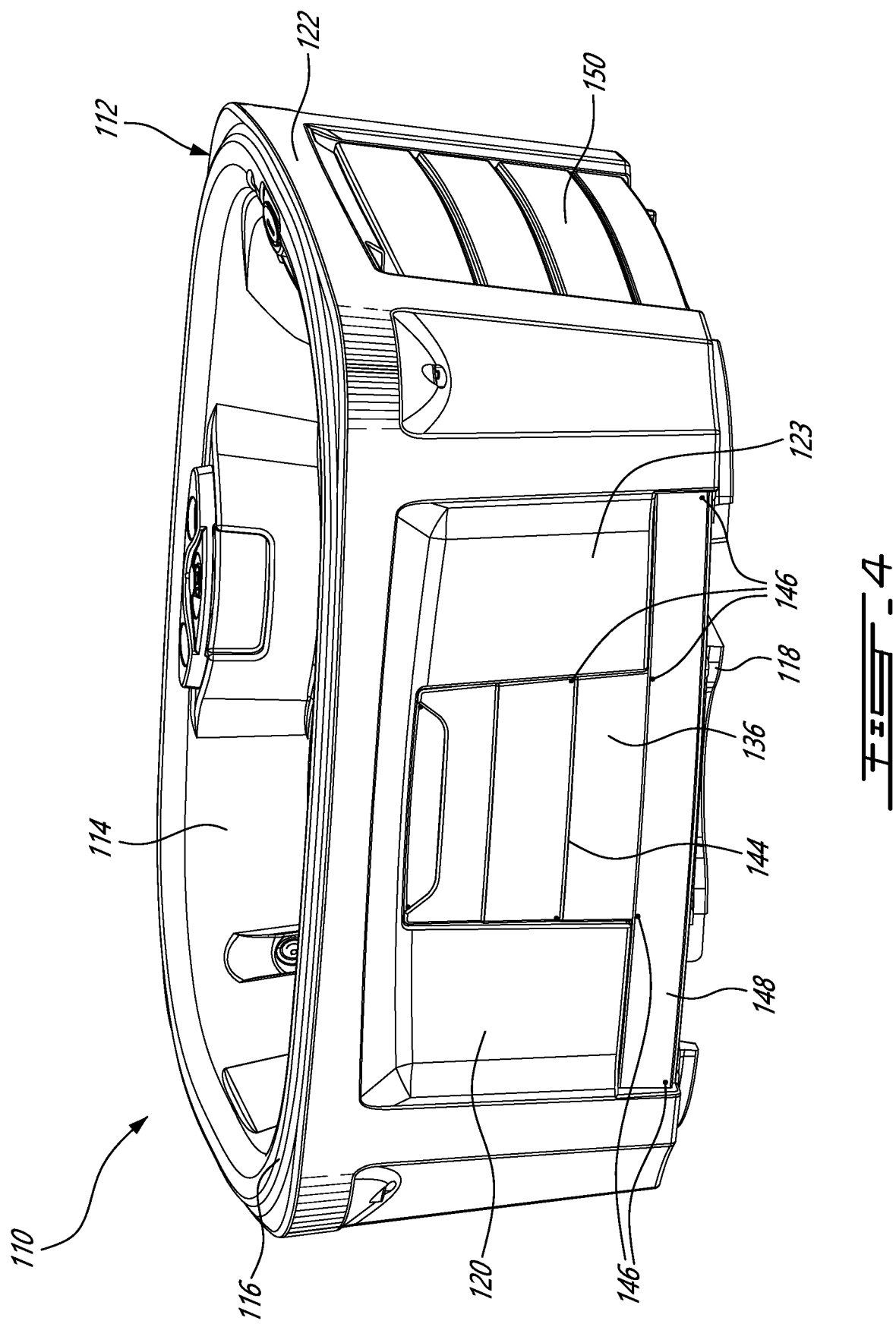

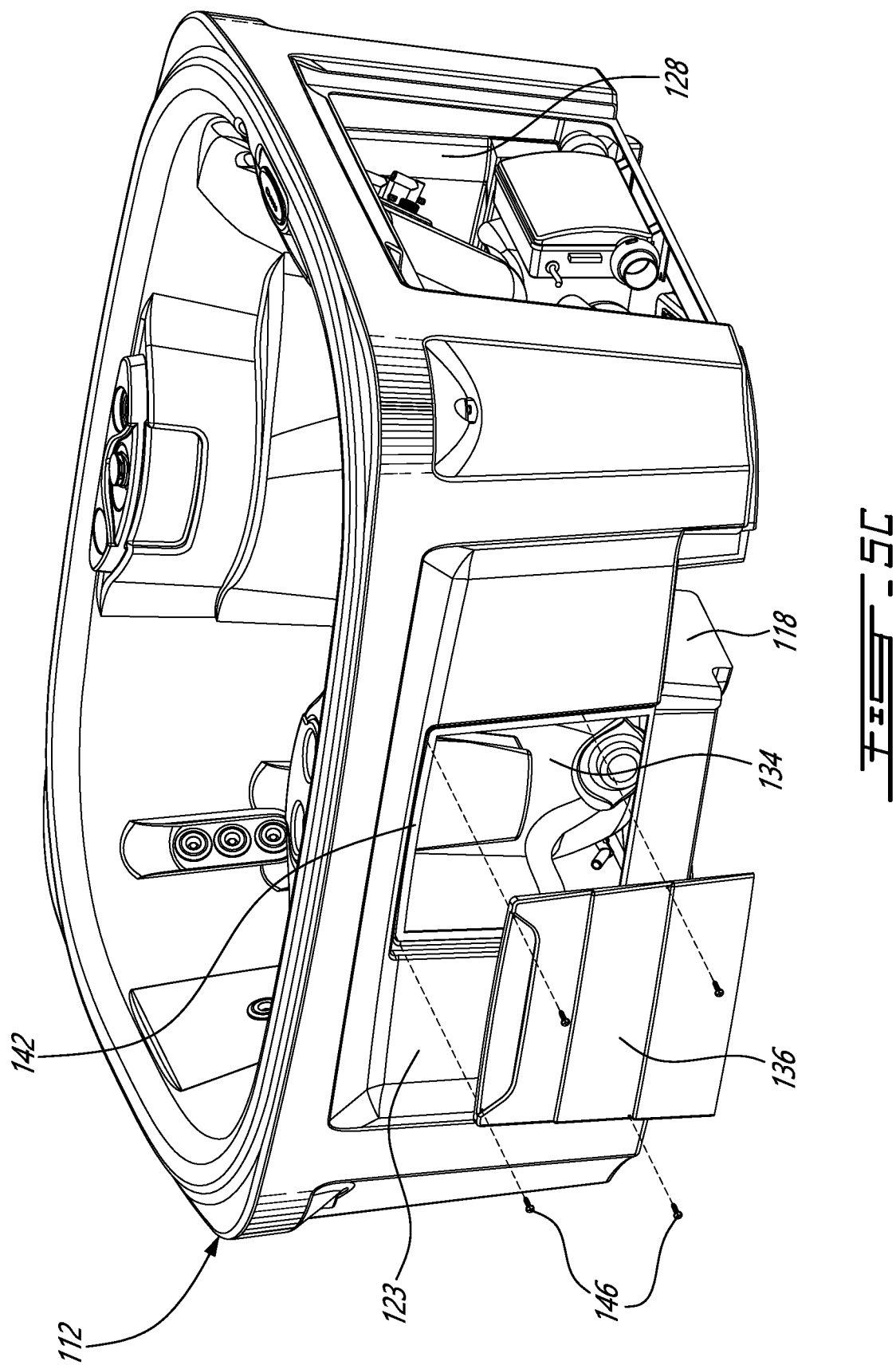

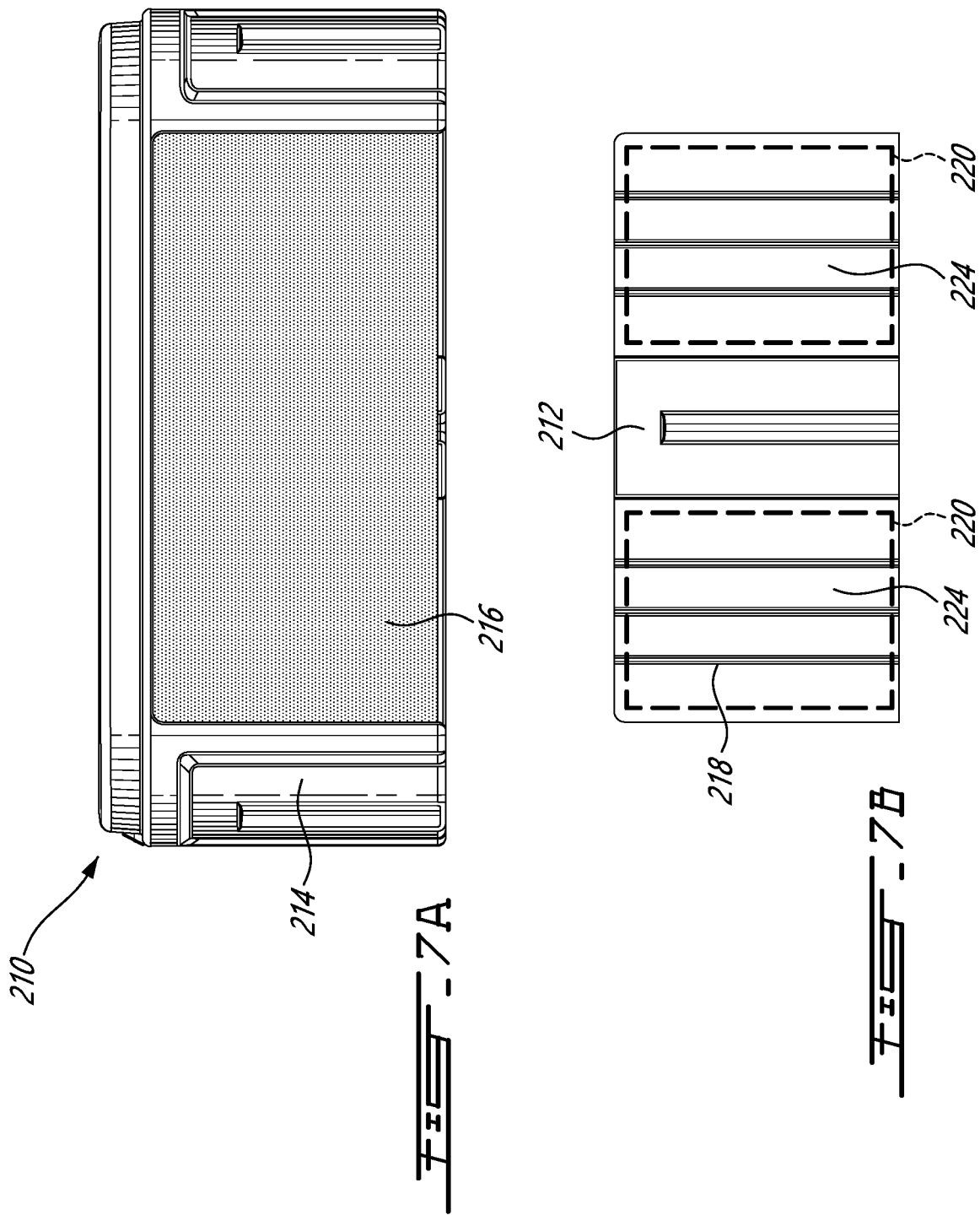

SPA PERIPHERAL WALL AND METHOD OF ASSEMBLY

FIELD

The improvements generally relate to the field of spas, and more specifically to spas having a molded side walls.

BACKGROUND

Spas, alternatively referred to as portable spas, hydrotherapy spas or hot tubs are increasingly widespread. Spas traditionally include a peripheral wall, also known as the spa's skirt or cabinet, which comprises the side walls surrounding the periphery of the basin, playing an important aesthetic and practical role in the spa's body. Most spas have a rectangular perimeter, and thus four side walls, but other perimeter shapes can exist. Depending on the class of spa, the peripheral wall may be moulded separately from the basin, such as in structures with acrylic basins for instance, or made integral to the basin, such as in rotomolded spas where unibody shells are produced, which include the basin and the peripheral wall as well as a cavity in between. Spa commercialization is highly competitive and there is a pressure on a number of factors, including costs, aesthetics, durability, etc., thus making molded peripheral walls increasingly attractive. However, the nature of the molding processes cause certain challenges in terms of achieving satisfactory molding efficiency and reducing the total amount of plastic material used, while maintaining certain practical and aesthetic properties. For instance, in rotomolded spas, openings in the periphery wall must be made in order to obtain access below the basin. Similarly, in spas with the peripheral wall installed, it is common to have access points to the most frequented internal components of the spa. While known techniques were satisfactory to a certain degree, there always remains room for improvement.

SUMMARY

Some molding processes impose limitations on the shape of the finished product. For instance, rotomolding may impose a motivation to include the molding of the walls in the rotomolding process, as unibody shells are produced. To produce the utility openings, portions of the walls are cutout, discarded and often replaced with other panels, which can lead to a loss of material and cost inefficiencies.

In accordance with one aspect, there is provided a method in which a portion, or an entirety, of the cutout is used to cover the same or another utility opening.

In accordance with another aspect, there is provided a method of manufacturing a spa including molding a plurality of side walls of the spa, cutting at least one utility opening in at least one of the side walls, thereby producing a cutout of a portion of a corresponding one of the walls, and securing the cutout to the spa in a manner that at least part of the cutout covers one of said at least one utility opening.

Many further features and combinations thereof concerning the present improvements will appear to those skilled in the art following a reading of the instant disclosure.

DESCRIPTION OF THE FIGURES

In the figures,

FIG. 1 is an oblique exploded view of an embodiment of a spa;

FIG. 2A to 2E are side views of the spa in FIG. 1 showing part of the incremental steps in the method of manufacturing of the side walls;

FIG. 3A shows the section 3A-3A of FIG. 2E;

FIG. 3B is the portion 3B-3B of FIG. 3A, shown enlarged;

FIG. 4 is an oblique view of another embodiment of a spa;

FIG. 5A to 5C are oblique views of the spa in FIG. 4 showing the incremental steps in the method of manufacturing of the side walls;

FIG. 7A is a side view of yet another embodiment of a spa, wherein the side walls are molded individually and are to be assembled;

FIG. 7B is a example a side wall to be assembled in a spa such as in FIG. 7A.

DETAILED DESCRIPTION

Figure 5A:
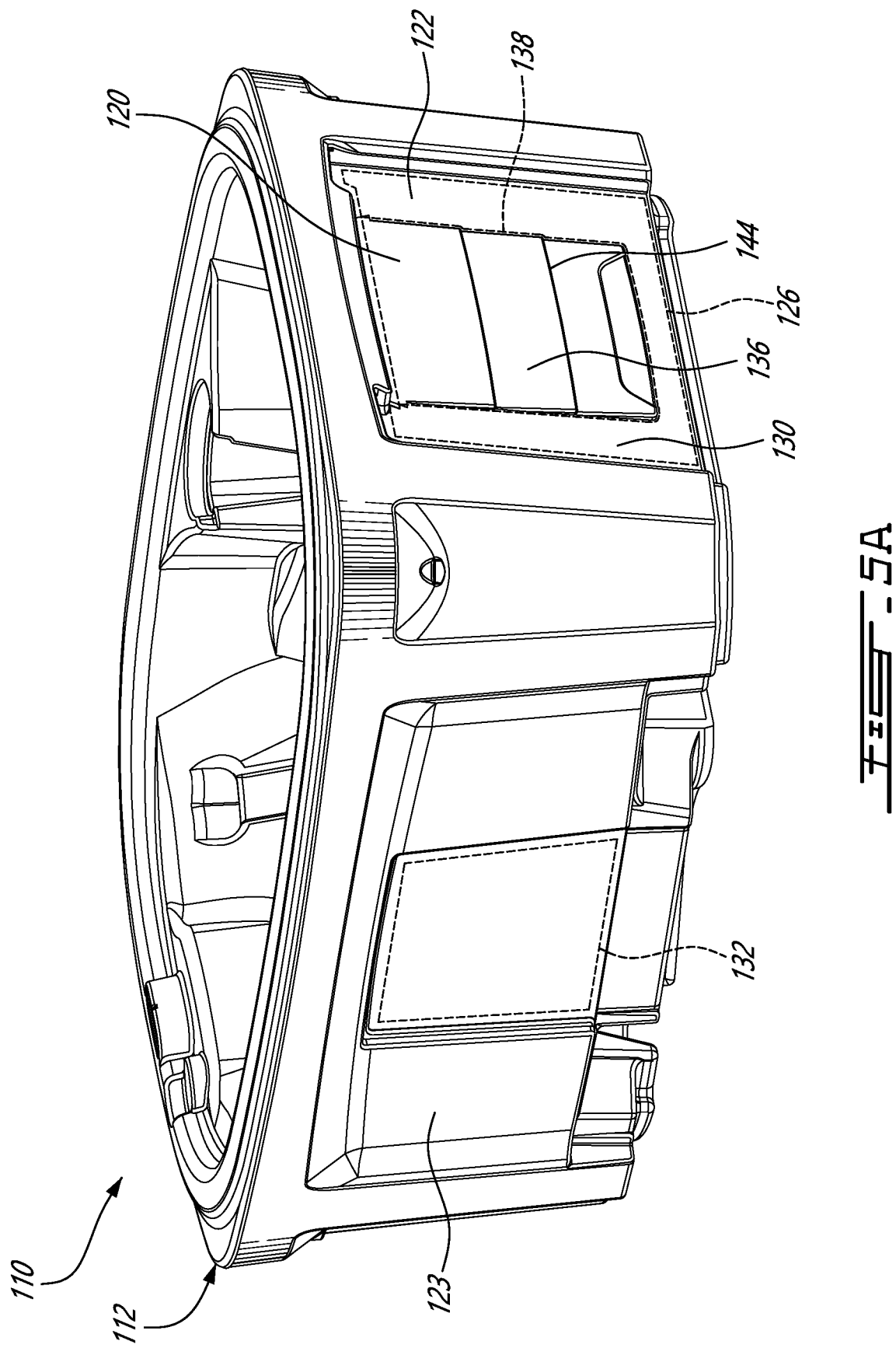

FIG. 1 shows an exploded oblique view of an assembled example spa 10. In this particular example, the spa 10 is made from a rotomolded unibody shell 12, defining a basin 14, wherein water and bathers are to be contained, an upper edge 16 surrounding the top of the basin 10, a base 18 and a peripheral wall 20 including a plurality of side walls 22. The peripheral wall 20 extending from the upper edge 16 to the base 18. In this example, the spa 10 is rectangular in shape, having four side walls 22 corresponding to the substantially linear portions of the shell 12. As will be further discussed below, each one of the side walls 22 includes two utility openings 24, providing access to the cavity 26 below the basin 14, with corresponding cutouts 28 and additional panels 30 covering the utility openings 24. Each one of the utility openings 24 is covered by a cutout 28 and an additional panel 30. The method of manufacture of the spa 10 in FIG. 1 is shown in FIGS. 2A-2E and will now be discussed below.

Attention is first brought to FIG. 2A, showing a side view of a rotomolded unibody shell 12 of a spa 10, wherein part of the peripheral wall 20 and one of the side walls 22 can be seen. In this example, the side wall 22 is molded with certain features such as creases 32, grooves 34 and regions to be cut (cutout outlines 36) in order to make utility openings 24. In this particular embodiment, the side wall 22 includes two regions with cutout outlines 36 to be cut in order to create utility openings 24. It may be understood that the cutout outline 36 may be visible on the side wall 22, such as by markings integral to the mold or markings added after molding, or may be omitted altogether without departing from the present disclosure.

As perhaps best seen in FIG. 2B, the utility opening 24 is cut along the cutout outline 36 and is rectangular in shape such that its length is longer than its width. In this particular embodiment, the length of the utility opening 24 is aligned with the height of the spa 10 whereas the width of the utility opening 24 is aligned with the length of the side wall 22. It can, however, be understood that the shape and orientation of the utility opening 24 may be altered without departing from the present disclosure. The cut of the utility opening 24 creates a cutout 28 that corresponds in shape and size and, in this example, contain the crease 32 features having been initially molded in the side wall 22.

Still referring to FIG. 2B, cutting the utility opening 24 further defines a lip 38 around the perimeter of the utility opening 24. As will be discussed below, the cutout 28 is placed in abutment with the lip 38 of the side wall 22 when covering the utility opening 24 and is used to secure the cutout 28 to the side wall 22. In this particular embodiment, the lip 38 is defined around the entire perimeter of the utility opening 24. It is, however, understood that, in alternate embodiments, the lip 38 may only be defined on certain sides of the utility opening 24, defined as a plurality of discrete sections or omitted altogether.

As shown in FIG. 2C, after cutting the utility opening 24, the cutout 28 is rotated 40 by 90 degrees, in such a way that the length of the cutout 28 overlaps the width of the utility opening 24 from which it was obtained. As perhaps best seen in FIG. 2D, the cutout 28 is then slid 52 into the groove 34 found on the top edge of the side wall 22 and placed in abutment with the side wall 22 via the lip 38, so as to cover a portion of the utility opening 24. An additional panel 30 is then inserted under the cutout 28 to cover the uncovered portion of the utility opening 24. In this example, the utility opening 24 includes a crease 32 corresponding to the creases 32 found in the cutout 28. Once assembled, the cutout 28 and the additional panel 30 produce a full cover for the utility opening 24 as best seen in FIG. 2E.

Attention is now brought to FIG. 3A, showing section 3A-3A of the assembled part of the side wall 22 in FIG. 2E. The cutout 28 is seen having its top edge slidingly engaged into the groove 34 of the side wall 22 and in abutment with the side wall 22 via the lip 38. Similarly, the additional panel 30 is placed in abutment with the lower part of the side wall 22 via the lip 38. As perhaps best seen in FIG. 3B, showing part 3B-3B of FIG. 3A enlarged, the additional panel 30 contains a clip 42 on its inner side 44, along its top edge 46 configured to receive and hold in engagement the lower edge 48 of the cutout 28. The lower edge 48 of the cutout 28 is slid into the clip 42 of the additional panel 30 when the additional panel 30 is added to the uncovered portion of the utility opening 24 after assembly of the cutout 28. It will be understood that the clip 42 of the additional panel 30 may be replaced by any suitable holding means or omitted altogether without departing from the present disclosure. For instance, the additional panel 30 may simply be placed in abutment with the lower edge of the cutout without having any holding means.

Returning to FIG. 3A, the cutout 28 and the additional panel 30 are secured to the side wall 22 via fasteners 50 received in their respective creases 32. In this particular example, there are three (3) fasteners 50 on each lateral side of the cutout 28, corresponding to the location of the creases 32 and one (1) corresponding fastener 50 on each lateral side of the additional panel 30, also corresponding to the location of the crease 32. However, it is understood that, the fasteners 50 may be omitted or replaced by any other suitable means of securing the cutout 28 and/or the additional panel 30 in alternate embodiments. For instance, in an alternative embodiment only the cutout 28 is fastened to the side wall 22, whereas the additional panel 30 is held in place via its top edge 46 clipped to the cutout 28. In yet another embodiment, the cutout 28 is unfastened and is held in place between the groove 34 of the side wall 22 and the clip 42 of the additional panel 30 which is fastened to the side wall 22.

The method described above can then be repeated as required for each one of the utility openings 24 on each of the side walls 22. In this particular embodiment, each one of the cutouts 28 covers the utility opening 24 from which it is obtained. However, in alternate embodiments, the cutouts 28 are used to cover a different utility opening 24 than the one from which it is obtained.

While the above example embodiment is directed to a rotomolded spa shell 12 with side walls 22 integral to the basin 14, the method is equally applicable to side walls molded separately from the basin, as will further be discussed below.

Attention is now brought to FIG. 4 showing another embodiment of the spa 110. In this particular example, the spa 110 is made from a rotomolded unibody shell 112, defining a basin 114, an upper edge 116, a base 118 and a peripheral wall 120 upwardly slanted outwardly from the basin 114, including a plurality of side walls 122, 123. The spa 110 is generally rectangular in shape, having four side walls 122 corresponding to the substantially linear portions of the shell 112. As will be discussed below, in this example, there are different sized utility openings 124 (shown covered in FIG. 4) on different side walls 122, 123. The method of manufacture of the spa 110 in FIG. 4 is shown in FIGS. 5A-5C and will now be discussed below.

Attention is first brought to FIG. 5A, showing an oblique view of the rotomolded unibody shell 112 of the spa 110, wherein two different side walls 122, 123 can be seen. In this example, the side walls 122, 123 are molded with different features. A first side wall 122 contains a main utility opening outline 126 to be cut in order to giving rise to a main utility opening 128 and a main utility opening cutout 130. Similarly, a second side wall 123 includes a side utility opening outline 132 to give rise to a side utility opening 134.

Figure 5B:
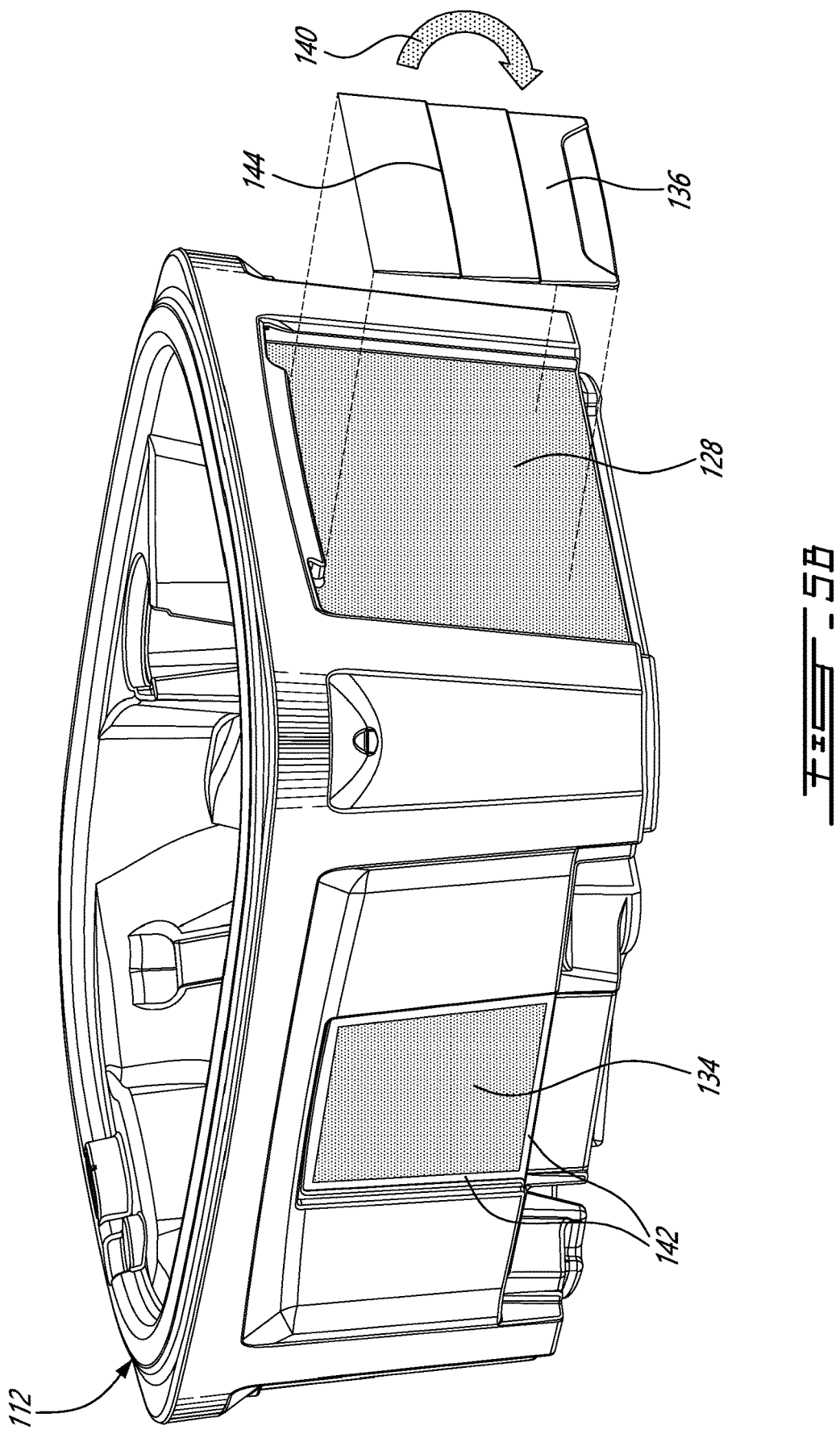

As perhaps best seen in FIG. 5B, the side walls 122, 123 are cut to create their respective utility openings 128, 134. In this example, two different sized utility openings, the side utility opening 134 and the main utility opening 128, are made on the different side walls 123, 122. The side utility opening 134 is smaller than the main utility opening 128. The main utility opening 128 creates a main utility cutout 130, which is then trimmed to a smaller sized cutout 136. The cutout 136 is trimmed by following the cutout outline 138, which serves as a guide. It is understood that the cutout outlines 126, 132, 138 may be visible on the side walls 122, 123, such as by having markings integral to the mold or markings added after molding, or may be omitted altogether without departing from the present disclosure.

The cutout 136, once trimmed from the larger main utility opening cutout 130, is then rotated 180 degrees 140 from its original orientation and, as perhaps best seen in FIG. 5C, is placed so as to cover the side utility opening 134. In this example, the cutout 136 is placed in abutment with a lip 142 found along the perimeter of the side utility opening 134, the lip 142 being defined when the side utility opening 134 is cut. As disclosed for the embodiment of FIG. 1, the lip 142 may be altered or omitted without departing from the present disclosure. The cutout 136 further includes ridge 144 features, which were included as part of the original mold.

In this particular embodiment, and as perhaps best seen in FIG. 5C, the cutout 136 is secured to the second side wall 123 via four (4) fasteners 146. However, as disclosed for the previous embodiment, the fastening method may be altered without departing from the present disclosure. For instance, in an alternative embodiment, the second side wall 123, containing the side utility opening 134, further includes a groove, where the top side of the cutout is sliding inserted and one (1) fastener is used along the bottom edge to secure the cutout 136 to the side wall 123.

Figure 6:
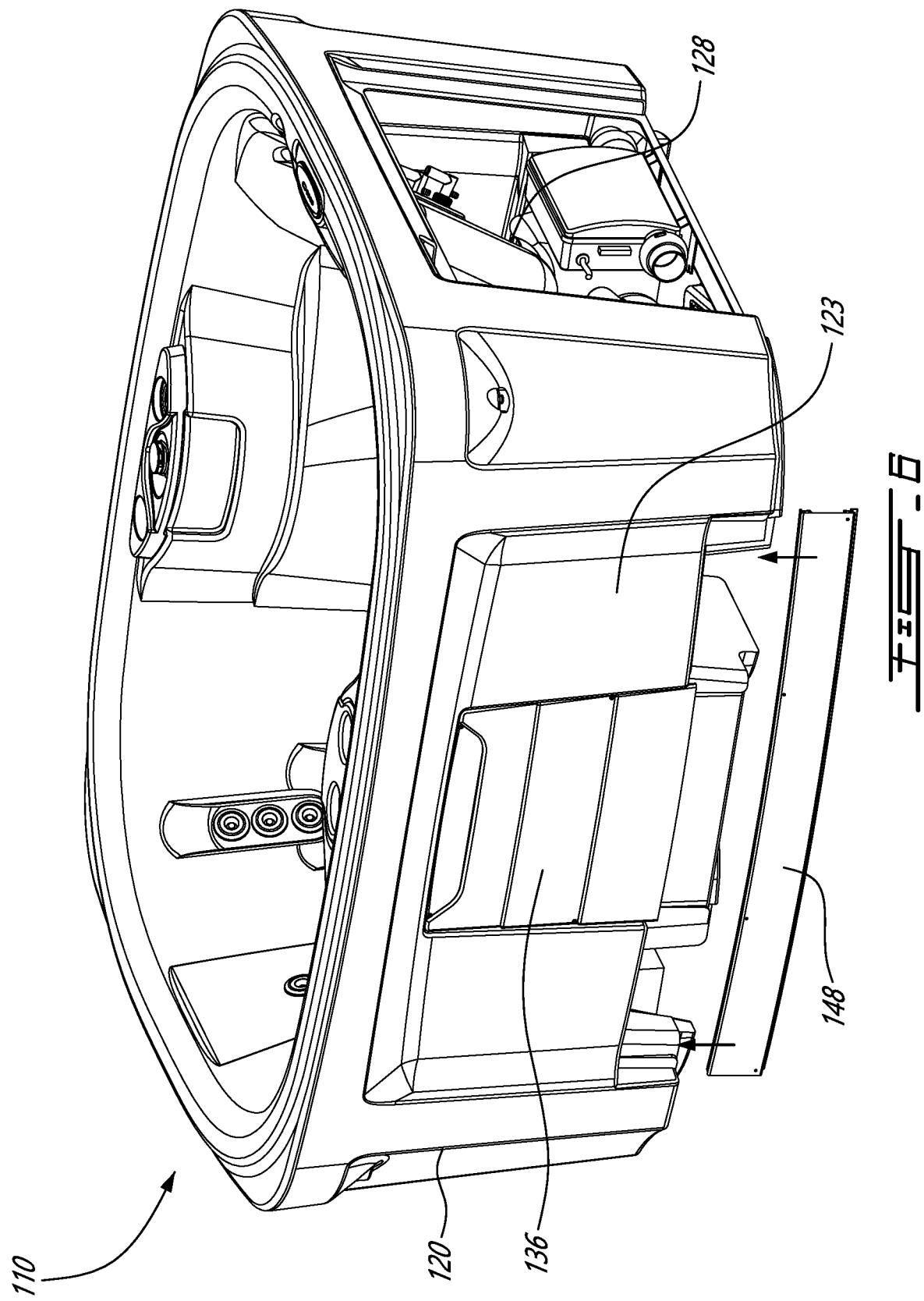
FIG. 6 is an oblique view of the spa in FIG. 4, wherein a trim panel is added to the side wall after the step of FIG. 5C.

Attention is now brought to FIG. 6. In this example, the spa 110 further includes a trim panel 148 placed under the cutout 136 covering the side utility opening 134. The trim panel 148 covers features of the base 118 which are otherwise visible under the side utility opening 134. As perhaps best seen in FIG. 4, the trim panel 148 is placed in abutment with the second side wall 123 and secured in place via fasteners 146. Similarly, a main panel 150 is added to cover the main utility opening 128.

Attention is now brought to FIG. 7A, showing yet another embodiment of a spa 210. In this example, the side walls 212 (FIG. 7B) of the spa 210 are made separately from the rest of the body. FIG. 7A shows a side view of a partially assembled spa 210 where part of the peripheral wall 214 has been assembled, thus defining a side wall aperture 216 to receive a separately molded side wall 212.

Figure 7C:
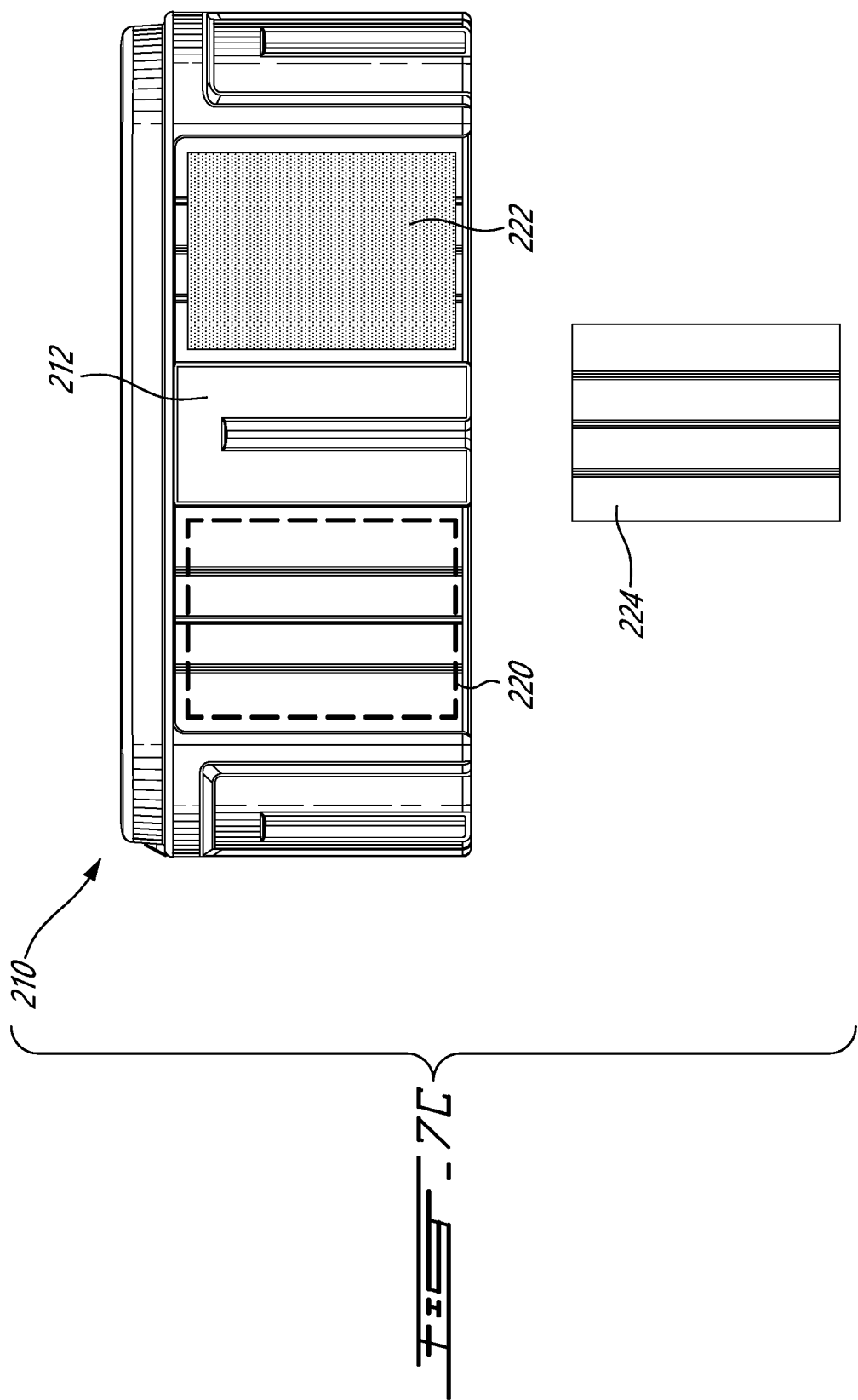
FIG. 7C shows the side wall of FIG. 7B assembled in the embodiment of the spa of FIG. 7A, wherein a cutout has been made in the side wall.

FIG. 7B shows a separately molded side wall 212 to be received in the side wall aperture 216 of FIG. 7A. This separate molded side wall 212 includes features corresponding to the ones found in the example spa of FIG. 1, such as the creases 218 and the regions to be cut, such as the cutout outlines 220, in order to make utility openings 222 (FIG. 7C). It is understood that in alternate embodiments, features differing from those disclosed above may be included. For instance, two separate side walls may be molded to correspond to the first and second side walls of the embodiment shown in FIG. 4. The separately molded side wall(s) may be molded by a different process and/or of a different material than other portions of the spa. The separately molded side wall can be made by rotomolding, thermoforming, or another process for instance. The separately molded side walls can be made of plastic, of fiberglass composite material, or of a different material, for instance.

The individually molded side wall 212 seen in FIG. 7B is assembled to the side wall aperture 216 of the spa 210 in FIG. 7A, resulting in the assembled spa 210 as shown in FIG. 7C. FIG. 7C shows the side wall 212 secured to the spa 210 and a utility opening 222 cut along a cutout outline 220, resulting in a corresponding cutout 224. In this example, the side wall 212 does not contain a groove (as seen in FIGS. 1 to 3B). Nevertheless, the method previously described can be applied analogously, by securing the cutout 224 to the side wall 212 via the fasteners without slidingly engaging the top edge to a groove.

It is understood that, when the side wall is molded separately to the spa, the order of the steps may be altered without departing from the present disclosure. For instance, the utility opening may be cut from the side wall before introducing it in the side wall aperture of the spa.

As can be understood, the examples described above and illustrated are intended to be exemplary only. For instance, the embodiment above all have a rectangular perimeter with generally straight side wall, but the present disclosure is also applicable to other perimeter shapes, such as round spas. The scope is indicated by the appended claims.

What is claimed is:

1. A method of manufacturing a spa including molding a plurality of side walls of the spa, cutting at least one utility opening in at least one of the side walls, thereby producing a cutout of a portion of a corresponding one of the walls, and securing the cutout to the spa in a manner that at least part of the cutout covers a first one of said at least one utility opening;

wherein the cutout and the first utility opening have a major dimension and a minor dimension and further includes rotating the cutout by 90 degrees such that the major dimension of the secured cutout overlaps edges along the minor dimension of the first utility opening.

2. The method of claim 1 wherein the cutout is obtained from the first utility opening being covered.

3. The method of claim 1 wherein the cutout and the first utility opening correspond in size and are rectangular in shape, wherein the major dimension is a height, and the minor dimension is a width of the rectangular shape.

4. The method of claim 1 further including using an additional panel to cover an uncovered portion of the first utility opening.

5. The method of claim 4 wherein using the additional panel to cover the uncovered portion of the first utility opening includes inserting an edge of the cutout in a clip of the additional panel.

6. The method of claim 4 further including fastening the additional panel to one of the side walls via at least one fastener.

7. The method of claim 1 wherein using the cutout to cover the first utility opening includes sliding an edge of the cutout into a groove on the side wall.

8. The method of claim 1 further including fastening the cutout to the side wall via at least one fastener.

9. The method of claim 1 wherein the side walls are molded at once, integral to the spa.

10. The method of claim 9 wherein the spa is made by rotary molding techniques.

11. The method of claim 1 wherein the cutout is cut from a first side wall and used to cover the first utility opening of a second side wall.

12. The method of claim 1 wherein cutting the at least one utility opening in at least one of the walls defines a lip surrounding at least one of an edge of the at least one utility opening.

13. The method of claim 12 wherein the cutout is placed in abutment with at least part of the lip when covering the first utility opening.

14. The method of claim 1 further including inserting a trim panel below the cutout on at least one side wall.

15. The method of claim 1 further including covering another one of the at least one utility opening with a main panel.

\* \* \* \* \*